US010279841B2

United States Patent
Ito et al.

(10) Patent No.: US 10,279,841 B2
(45) Date of Patent: May 7, 2019

(54) VEHICLE FRONT PORTION STRUCTURE

(71) Applicant: TOYOTA JIDOSHA KABUSHIKI KAISHA, Toyota-shi (JP)

(72) Inventors: Keita Ito, Aichi-gun (JP); Yuji Takahashi, Nissin (JP); Ryoji Matsumoto, Okazaki (JP); Hironori Kadoi, Toyota (JP); Yutaka Yamada, Kariya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/013,767

(22) Filed: Feb. 2, 2016

(65) Prior Publication Data
US 2016/0264178 A1    Sep. 15, 2016

(30) Foreign Application Priority Data
Mar. 10, 2015   (JP) ................................. 2015-047260

(51) Int. Cl.
*B62D 21/15*    (2006.01)
(52) U.S. Cl.
CPC ................................. *B62D 21/152* (2013.01)
(58) Field of Classification Search
CPC ............. B60R 19/34; B60R 2019/247; B60R 2021/0023; B62D 21/152
See application file for complete search history.

(56) References Cited

U.S. PATENT DOCUMENTS

| | | | | |
|---|---|---|---|---|
| 8,596,711 | B2* | 12/2013 | Yasui | B60R 19/34 296/187.09 |
| 8,807,632 | B2* | 8/2014 | Ramoutar | B60R 19/24 293/132 |
| 8,888,168 | B2* | 11/2014 | Kuwabara | B62D 21/152 296/187.09 |
| 9,016,767 | B2* | 4/2015 | Sotoyama | B62D 21/152 296/187.09 |
| 9,061,713 | B2* | 6/2015 | Hashimoto | B62D 21/152 |
| 9,102,358 | B2* | 8/2015 | Basappa | B62D 21/152 |

(Continued)

FOREIGN PATENT DOCUMENTS

| | | | | |
|---|---|---|---|---|
| DE | 202013007806 | U1 * | 12/2014 | B60R 19/04 |
| DE | 102013018078 | U1 * | 5/2015 | B62D 21/152 |

(Continued)

*Primary Examiner* — Gregory A Blankenship
(74) *Attorney, Agent, or Firm* — Oblon, McClelland, Maier & Neustadt, L.L.P.

(57) ABSTRACT

A vehicle front portion structure including: a front side member that extends in a vehicle longitudinal direction at a vehicle transverse direction outer side portion of a vehicle front portion and includes a projecting portion that projects-out toward a vehicle transverse direction outer side at an outer side wall at a front end portion; a spacer that is provided at a vehicle transverse direction outer side of the front side member and is fastened to the outer side wall at a vehicle front side of the projecting portion, and that has an adjacent portion that is adjacent to a vehicle transverse direction outer side of the projecting portion; and an engaging portion that is formed at the spacer and is disposed at a vehicle front side with respect to the projecting portion, and that engages with a front end of the projecting portion in the vehicle longitudinal direction.

10 Claims, 11 Drawing Sheets

(56) References Cited

U.S. PATENT DOCUMENTS

| | | | | |
|---|---|---|---|---|
| 9,127,968 | B2* | 9/2015 | Cuddihy | B60R 19/16 |
| 9,156,418 | B2* | 10/2015 | Ramoutar | B60R 19/24 |
| 9,180,828 | B2* | 11/2015 | Sakakibara | B60R 19/34 |
| 9,199,591 | B2* | 12/2015 | Weil | B60R 19/34 |
| 9,211,915 | B2* | 12/2015 | Abe | B62D 21/152 |
| 9,266,485 | B2* | 2/2016 | Kuriyama | B60R 19/34 |
| 9,290,138 | B2* | 3/2016 | Muraji | B62D 21/152 |
| 9,308,940 | B1* | 4/2016 | Malavalli | B62D 25/082 |
| 9,394,003 | B2* | 7/2016 | Matsumoto | B62D 21/02 |
| 9,421,865 | B2* | 8/2016 | Bernardi | B60K 5/1275 |
| 9,421,927 | B2* | 8/2016 | Basappa | B60R 19/26 |
| 9,481,334 | B1* | 11/2016 | Matsumoto | B60R 19/34 |
| 9,517,799 | B2* | 12/2016 | Matsumoto | B62D 25/08 |
| 9,539,966 | B2* | 1/2017 | Kato | B62D 21/152 |
| 9,555,756 | B2* | 1/2017 | Sugano | B60R 19/04 |
| 9,676,416 | B2* | 6/2017 | Kitakata | B62D 21/152 |
| 9,771,106 | B2* | 9/2017 | Ogawa | B62D 21/152 |
| 2004/0195862 | A1* | 10/2004 | Saeki | B62D 21/152 296/187.09 |
| 2014/0361560 | A1* | 12/2014 | Sakakibara | B62D 21/152 293/133 |
| 2015/0251702 | A1* | 9/2015 | Volz | B62D 21/152 296/187.1 |
| 2015/0298634 | A1* | 10/2015 | Hara | B60R 19/34 293/133 |
| 2016/0121934 | A1* | 5/2016 | Murayama | B62D 25/082 296/187.09 |
| 2016/0221608 | A1* | 8/2016 | Hiramatsu | B62D 25/082 |
| 2016/0347374 | A1* | 12/2016 | Miyamoto | B62D 21/152 |
| 2017/0036699 | A1* | 2/2017 | Asai | B62D 25/082 |
| 2017/0106823 | A1* | 4/2017 | Lieven | B60R 19/34 |
| 2017/0210316 | A1* | 7/2017 | Duffe | B60R 19/04 |

FOREIGN PATENT DOCUMENTS

| | | | | |
|---|---|---|---|---|
| DE | 102014206674 | A1 * | 10/2015 | B62D 21/152 |
| EP | 2 957 485 | A1 | 12/2015 | |
| EP | 2987705 | A1 * | 2/2016 | B62D 21/152 |
| JP | 2013-212757 | | 10/2013 | |
| JP | 2014-156198 | | 8/2014 | |
| JP | 2015-33960 | | 2/2015 | |
| WO | WO 2014173476 | A1 * | 10/2014 | B62D 21/152 |
| WO | WO 2015/019167 | A1 | 2/2015 | |
| WO | WO 2016069320 | A1 * | 5/2016 | B62D 21/152 |

* cited by examiner

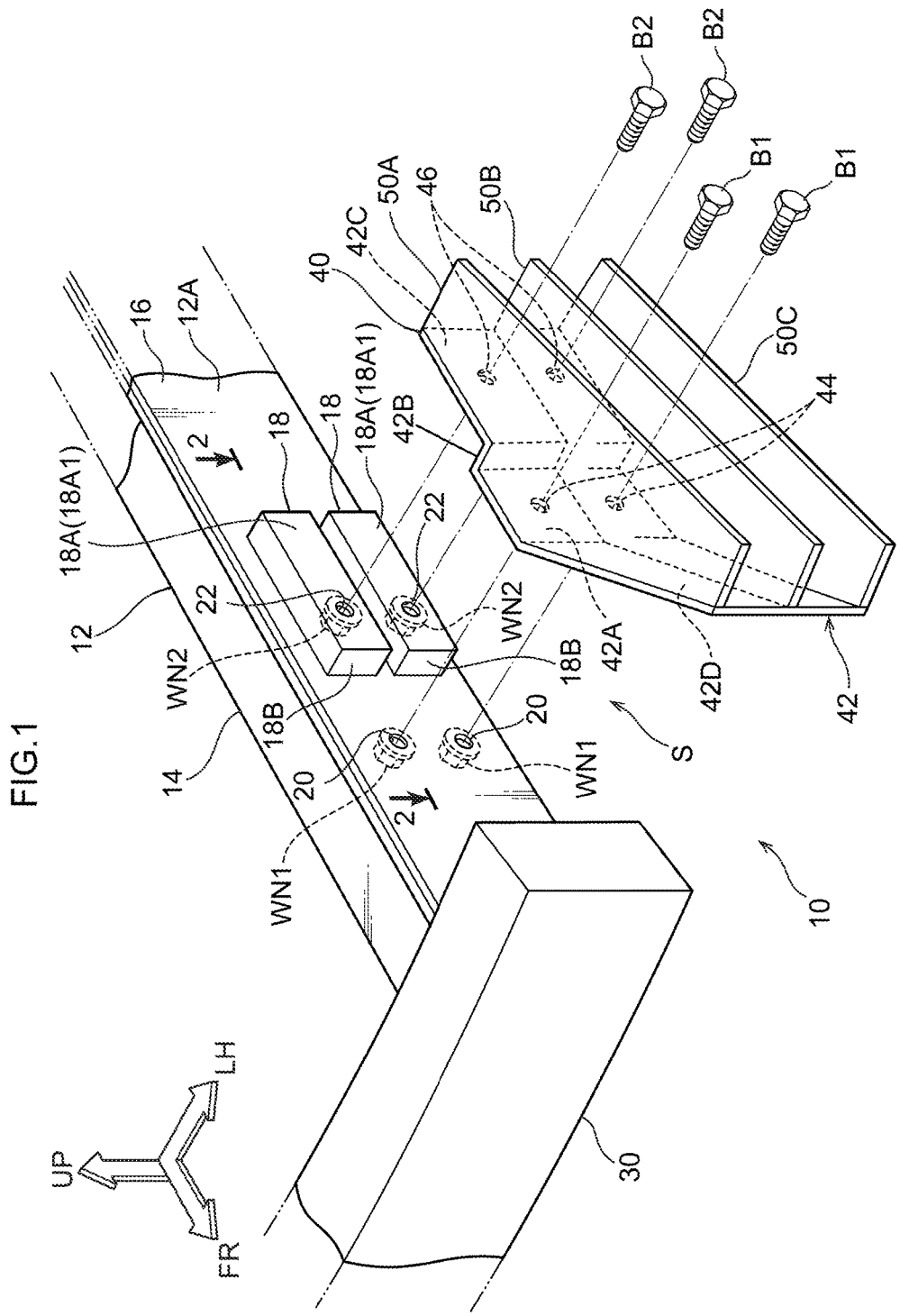

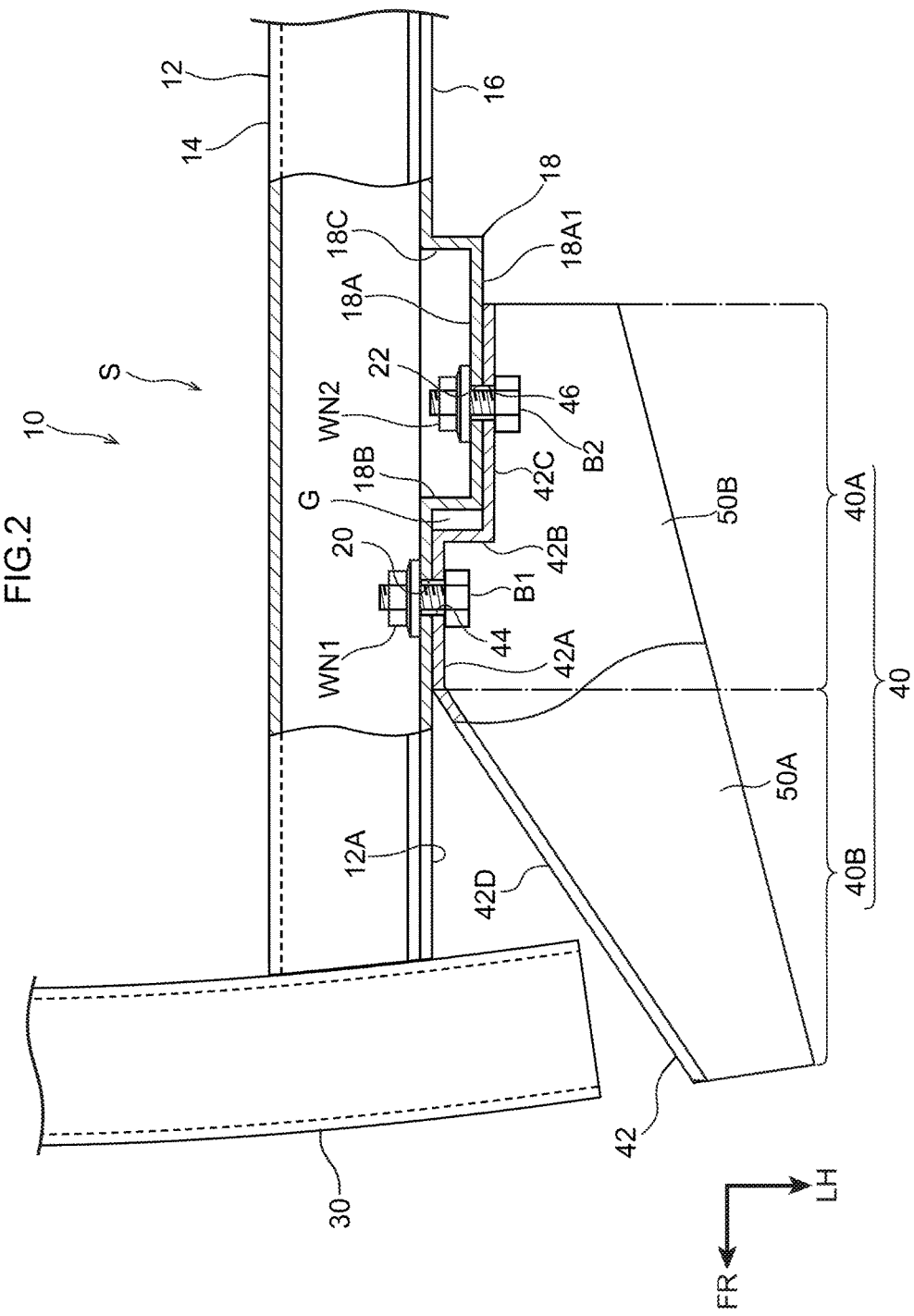

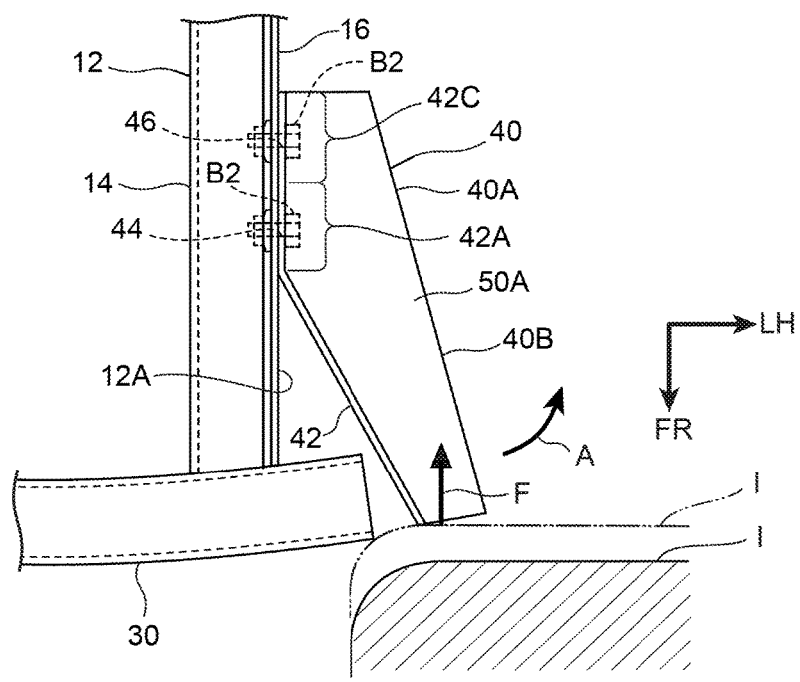

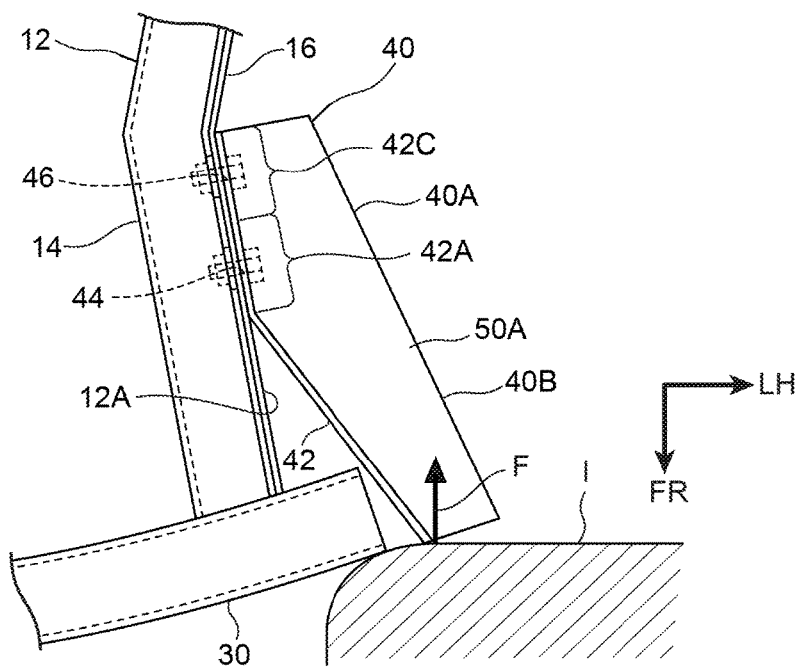

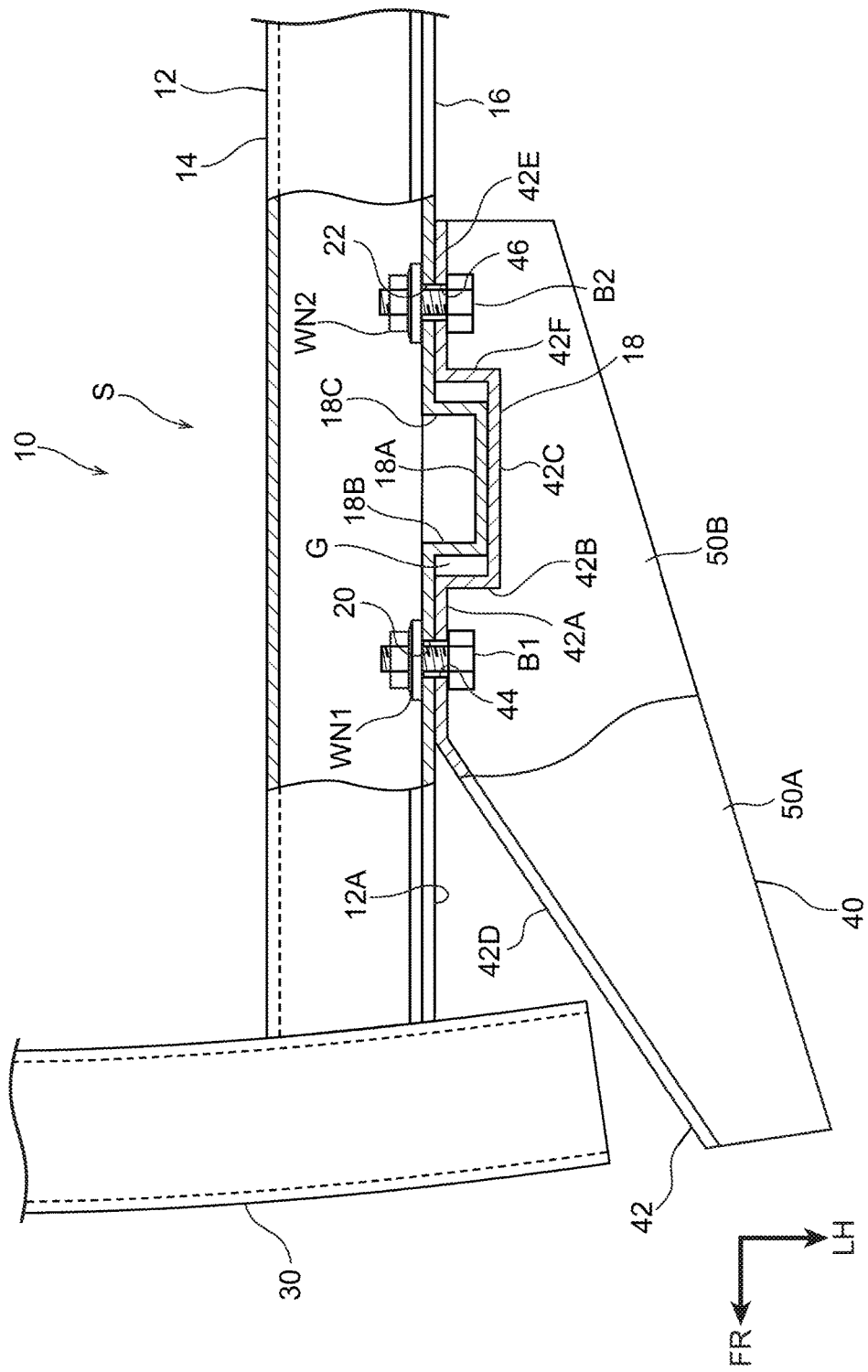

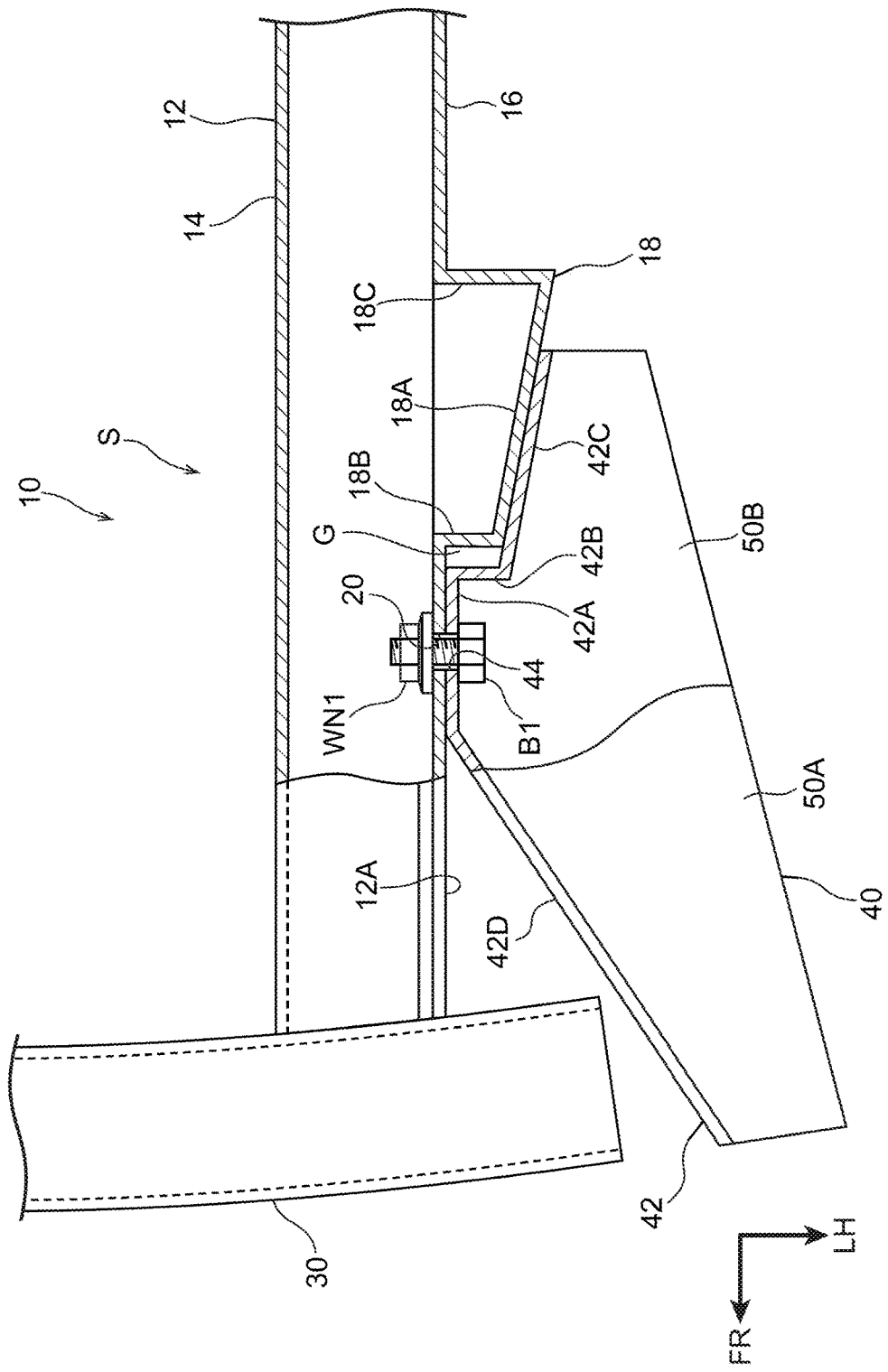

VEHICLE FRONT PORTION STRUCTURE

CROSS-REFERENCE TO RELATED APPLICATION

This application is based on and claims priority under 35 USC 119 from Japanese Patent Application No. 2015-047260 filed on Mar. 10, 2015, the disclosure of which is incorporated by reference herein.

BACKGROUND

Technical Field

The present invention relates to a vehicle front portion structure.

Related Art

In the vehicle front portion structure disclosed in Japanese Patent Application Laid-Open (JP-A) No. 2014-156198 that is described hereinafter, a spacer is provided at the outer side wall of a front side member. This spacer has a rear side mounting portion that is fastened to the outer side wall of the front side member, an outer side front wall portion that is positioned further toward the vehicle front side and the vehicle transverse direction outer side than the rear side mounting portion, and a load transmitting rib that connects the outer side front wall portion and the rear side mounting portion.

When a collision body collides with the outer side front wall portion of the spacer at the time of a small-overlap collision of the vehicle (among front collisions of a vehicle, for example, a collision in which the amount of overlap in the vehicle transverse direction with the collision body that is prescribed by IIHS is less than or equal to 25%), the collision load toward the vehicle rear side is transmitted via the load transmitting rib to the rear side mounting portion, and the front side member deforms so as to bend. Concretely, the spacer rotates with the rear side mounting portion being the starting point such that the region of the spacer, which region is further toward the vehicle rear side than the rear side mounting portion, is displaced toward the vehicle transverse direction inner side, and the front side member bends so as to become convex toward the vehicle transverse direction inner side. As a result, the power unit of the vehicle is pushed toward the vehicle transverse direction inner side by the front side member, and lateral force toward the vehicle transverse direction inner side arises at the power unit.

By the way, in order to effectively absorb collision energy at the time of a small overlap collision, it is desirable to compressively deform the front side member in the vehicle longitudinal direction by the collision load that is inputted to the spacer.

However, in the above-described vehicle front portion structure, as described above, in the initial stage of a small overlap collision, the front side member bends so as to become convex toward the vehicle transverse direction inner side, and therefore, this is a structure in which it is difficult to compressively deform the front side member in the vehicle longitudinal direction. Thus, in the above-described vehicle front portion structure, there is room for improvement with regard to effectively absorbing collision energy.

SUMMARY

In view of the above-described circumstances, an object of the present invention is to provide a vehicle front portion structure that can effectively absorb collision energy at the time of a small overlap collision.

A first aspect of the present invention provides a vehicle front portion structure including:

a front side member that extends in a vehicle longitudinal direction at a vehicle transverse direction outer side portion of a vehicle front portion, and that includes a projecting portion that projects-out toward a vehicle transverse direction outer side at an outer side wall at a front end portion;

a spacer that is provided at a vehicle transverse direction outer side of the front side member, that is fastened to the outer side wall at a vehicle front side of the projecting portion, and that has an adjacent portion that is adjacent to a vehicle transverse direction outer side of the projecting portion; and an engaging portion that is formed at the spacer, that is disposed at a vehicle front side with respect to the projecting portion, and that is structured to be able to engage with a front end of the projecting portion in the vehicle longitudinal direction.

In the vehicle front portion structure of the first aspect of the present invention, the front side member extends in the vehicle longitudinal direction at the vehicle transverse direction outer side portion of the vehicle front portion. This front side member has, at the outer side wall of the front end portion, the projecting portion that projects-out toward the vehicle transverse direction outer side. Further, the spacer is provided at the vehicle transverse direction outer side of the front end portion of the front side member. This spacer is fastened to the outer side wall of the front side member at the front side of the projecting portion. Therefore, when collision load toward the vehicle rear side is inputted to the spacer at the time of a small overlap collision, the spacer starts to rotate with the fastened region being the starting point, such that the portion of the spacer, which portion is further toward the vehicle rear side than the region fastened to the outer side wall, is displaced toward the vehicle transverse direction inner side. Due thereto, the portion of the spacer, which portion is further toward the vehicle rear side than the fastened region, pushes the front side member in toward the vehicle transverse direction inner side, and the front side member starts to bend so as to become convex toward the vehicle transverse direction inner side.

Here, the spacer has the adjacent portion that is adjacent to the vehicle transverse direction outer side of the projecting portion. Namely, at the vehicle rear side of the fastened region of the spacer, the adjacent portion of the spacer is disposed so as to be adjacent to the vehicle transverse direction outer side of the projecting portion. Therefore, when the spacer starts to rotate, the adjacent portion starts to push the projecting portion in toward the vehicle transverse direction inner side, but, because the bending strength of the front side member is increased due to the projecting portion, the front side member bending so as to become convex toward the vehicle transverse direction inner side is suppressed (it is difficult for the front side member to bend).

Further, the engaging portion, that is structured so as to be able to engage with the front end of the projecting portion in the vehicle longitudinal direction, is formed at the spacer at the vehicle front side with respect to the projecting portion. Therefore, in a case in which the front end of the projecting portion and the engaging portion are engaged (made to abut one another) in advance, the collision load that is inputted to the spacer at the time of a small overlap collision is transmitted to the front side member via the projecting portion, and the front side member compressively deforms in the vehicle longitudinal direction. Further, in a case in which a gap is formed between the front end of the projecting portion and the engaging portion, due to the fastened state of the spacer and the front side member being cancelled at the time of a small overlap collision for example, the spacer is displaced toward the vehicle rear side relative to the front side member, and the engaging portion of the spacer and the front end of the projecting portion engage in the vehicle longitudinal direction. Due thereto, the collision load is transmitted to the front side member via the projecting portion, and the front side member compressively deforms in the vehicle longitudinal direction. Accordingly, at the time of a small overlap collision, collision energy can be effectively absorbed.

A second aspect of the present invention provides the vehicle front portion structure of the first aspect, wherein a gap is formed between the front end of the projecting portion and the engaging portion.

In the vehicle front portion structure of the second aspect of the present invention, a gap is formed between the front end of the projecting portion and the engaging portion. Therefore, for example, assembly errors at the time of assembling the spacer to the front side member can be absorbed by this gap.

A third aspect of the present invention provides the vehicle front portion structure of the first aspect, wherein:

plural projecting portions are provided at the outer side wall, and extend in the vehicle longitudinal direction; and the plural projecting portions are disposed so as to be lined-up in a vehicle vertical direction.

In the vehicle front portion structure of the third aspect of the present invention, the plural projecting portions, that extend in the vehicle longitudinal direction, are disposed so as to be lined-up in the vehicle longitudinal direction. Therefore, the effect of reinforcing the front side member by the projecting portions can be strengthened.

A fourth aspect of the present invention provides the vehicle front portion structure of the first aspect, wherein the spacer is fastened to the projecting portion in addition to the outer side wall.

In the vehicle front portion structure of the fourth aspect of the present invention, the spacer is fastened to the front side member also at the region of the projecting portion, in addition to at the outer side wall. Thus, the collision load that is inputted to the spacer can be dispersed and transmitted to the front side member. Due thereto, bending of the front side member at the time of a small overlap collision can be suppressed more.

A fifth aspect of the present invention provides the vehicle front portion structure of the first aspect, wherein, as seen in a side view, a rear end of the spacer is disposed so as to overlap the projecting portion.

In the vehicle front portion structure of the fifth aspect of the present invention, when the spacer starts to rotate in the initial stage of a small overlap collision, the rear end of the spacer can be supported from the vehicle transverse direction inner side by the projecting portion. Due thereto, rotation of the spacer at the time of a small overlap collision is suppressed effectively, and the front side member bending so as to become convex toward the vehicle transverse direction inner side can be suppressed effectively.

In accordance with the vehicle front portion structure of the first aspect of the present invention, collision energy can be effectively absorbed at the time of a small overlap collision.

In accordance with the vehicle front portion structure of the second aspect of the present invention, assembly errors at the time of assembling the spacer to the front side member for example can be absorbed by the gap.

In accordance with the vehicle front portion structure of the third aspect of the present invention, the effect of reinforcing the front side member by the projecting portions can be strengthened.

In accordance with the vehicle front portion structure of the fourth aspect of the present invention, bending of the front side member at the time of a small overlap collision can be suppressed more.

In accordance with the vehicle front portion structure of the fifth aspect of the present invention, rotation of the spacer at the time of a small overlap collision is suppressed effectively, and the front side member bending so as to become convex toward the vehicle transverse direction inner side can be suppressed effectively.

BRIEF DESCRIPTION OF THE DRAWINGS

Exemplary embodiments of the present invention will be described in detail based on the following figures, wherein:

FIG. 1 is a schematic exploded perspective view that is seen obliquely from a vehicle front left side and that illustrates the vehicle left side portion of the front end portion of a vehicle, to which a vehicle front portion structure relating to a present embodiment is applied, in a state in which a spacer has been removed;

FIG. 2 is a partially-broken, partial plan sectional view (a cross-sectional view along line 2-2 of FIG. 1) illustrating the vehicle left side portion of the front end portion of the vehicle illustrated in FIG. 1;

FIG. 3A is a plan view illustrating a state immediately before a small overlap collision between a collision body and a vehicle to which a vehicle front portion structure of a comparative example is applied;

FIG. 3B is a plan view illustrating the initial state of the small overlap collision between the collision body and the vehicle illustrated in FIG. 3A;

FIG. 5 is a partial plan sectional view that corresponds to FIG. 2 and that illustrates an example in which the placed position of a second weld nut illustrated in FIG. 2 is changed;

FIG. 7 is a partial plan sectional view that corresponds to FIG. 2 and that illustrates another example of a modified example of a projecting portion illustrated in FIG. 2.

DETAILED DESCRIPTION

Figure 4A:
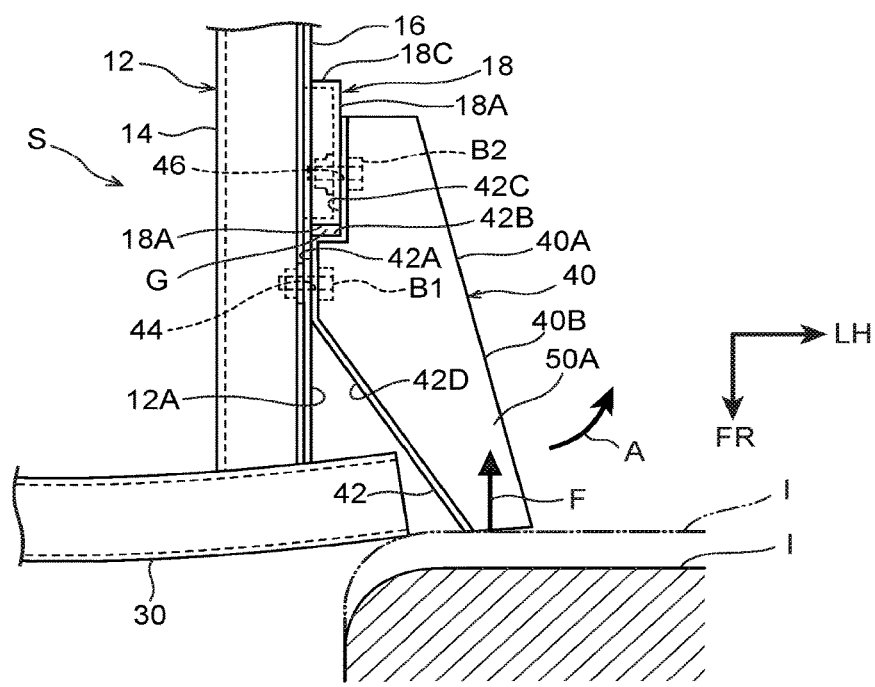
FIG. 4A is a plan view illustrating a state immediately before a small overlap collision between a collision body and the vehicle to which the vehicle front portion structure of the present embodiment is applied.

A vehicle (automobile) 10, to which a vehicle front portion structure S relating to an embodiment of the present invention is applied, is described hereinafter by using the drawings. Note that arrow FR that is shown appropriately in the drawings indicates the vehicle front side, arrow UP indicates the vehicle upper side, and arrow LH indicates the vehicle left side (a vehicle transverse direction one side). Hereinafter, when merely longitudinal, vertical and left-right directions are used, they indicate the longitudinal of the vehicle longitudinal direction, the vertical of the vehicle vertical direction, and the left and right of the vehicle left-right direction unless otherwise indicated.

The vehicle front portion structure S is applied to the vehicle transverse direction both side portions of the front end portion of the vehicle 10, and is structured so as to have left-right symmetry in the vehicle transverse direction. Therefore, in the following description, the left side portion of the front end portion of the vehicle 10 is described, and description of the right side portion of the front end portion of the vehicle 10 is omitted.

As shown in FIG. 1 and FIG. 2, the vehicle 10 is structured to include front side members 12 (hereinafter called "FS members 12"), a bumper reinforcement 30 (hereinafter called "bumper RF 30"), and spacers 40. These respective structures are described hereinafter.

The FS member 12 is provided at the vehicle transverse direction outer side portion of the front portion of the vehicle 10. An unillustrated power unit of the vehicle 10 is disposed at the vehicle transverse direction inner side of the FS member 12. This FS member 12 is formed in a substantially rectangular closed cross-sectional shape, and extends in the longitudinal direction. Concretely, the FS member 12 is structured to include an inner panel 14 that structures the vehicle transverse direction inner side portion of the FS member 12, and an outer panel 16 that structures the vehicle transverse direction outer side portion of the FS member 12. The inner panel 14 is formed substantially in the shape of a hat that opens toward the vehicle transverse direction outer side as seen in a front view. Further, the outer panel 16 is formed in a substantial plate shape, and is disposed with the vehicle transverse direction being the plate thickness direction thereof The outer panel 16 is joined by spot welding or the like to upper and lower flange portions at the opening portion of the inner panel 14. Due thereto, an outer side wall 12A (the vehicle transverse direction outer side wall) of the FS member 12 is structured by the outer panel 16.

A pair of projecting portions 18, that project-out toward the vehicle transverse direction outer side, are formed integrally with the outer side wall 12A at the front end portion of the FS member 12. The pair of projecting portions 18 are formed in substantially rectangular shapes whose length directions are the longitudinal direction as seen in a side view, and are disposed so as to be lined-up in the vertical direction. Further, as seen in a plan sectional view, the projecting portions 18 are formed in concave shapes that open toward the vehicle transverse direction inner side (see FIG. 2). Concretely, the projecting portion 18 is structured to include an outer wall 18A that is disposed with the vehicle transverse direction being the plate thickness direction thereof, a front wall 18B (in a broad sense, an element that can be understood as being a "load receiving wall") that is bent at a substantial right angle toward the vehicle transverse direction inner side at the front end of the outer wall 18A, and a rear wall 18C (see FIG. 2) that is bent at a substantial right angle toward the vehicle transverse direction inner side at the rear end of the outer wall 18A. Due thereto, the front wall 18B structures the front end of the projecting portion 18. Further, the outer side surface of the outer wall 18A of the projecting portion 18 is a projection surface 18A1.

A pair of first weld nuts WN1 (in a broad sense, elements that can be understood as being "fixing portions"), that are for fastening the spacer 40 that is described later, are fixed to the inner side surface of the outer side wall 12A of the FS member 12. The first weld nuts WN1 are respectively disposed at the front sides of the projecting portions 18, and are disposed so as to be lined-up in the vertical direction. Further, first insert-through holes 20 that are circular are formed so as to pass-through the outer side wall 12A, and the first insert-through holes 20 are disposed coaxially with the first weld nuts WN1.

Moreover, second weld nuts WN2 (in a broad sense, elements that can be understood as being "fixing portions"), that are for fastening the spacer 40 that is described later, are respectively fixed to the inner side surfaces of the outer walls 18A of the projecting portions 18, at the front side portions of the outer walls 18A. The second weld nuts WN2 are disposed so as to be lined-up in the vertical direction. Further, second insert-through holes 22 that are circular are formed so as to pass-through the outer walls 18A of the projecting portions 18, and the second insert-through holes 22 are disposed coaxially with the second weld nuts WN2.

The bumper RF 30 is produced by, for example, extrusion molding or the like, and is formed in a substantially rectangular closed cross-sectional shape, and extends in the vehicle transverse direction. This bumper RF 30 is disposed at the front side of the FS members 12. The vehicle transverse direction outer side portions of the bumper RF 30 are joined to the front ends of the FS members 12. Further, the vehicle transverse direction outer side end portions of the bumper RF 30 project-out further toward the vehicle transverse direction outer sides than the FS members 12.

The spacer 40 is provided at the vehicle transverse direction outer side of the front end portion of the FS member 12, and, on the whole, extends in the longitudinal direction. Concretely, the spacer 40 is structured to include a spacer main body portion 40A (see FIG. 2) that structures the rear portion of the spacer 40 and is adjacent to the vehicle transverse direction outer side of the FS member 12, and a spacer extension portion 40B (see FIG. 2) that structures the front portion of the spacer 40 and that extends-out obliquely toward the front side and the vehicle transverse direction outer side from the spacer main body portion 40A. Further, the spacer 40 is formed by plural plates being connected (joined), and is formed in a substantial E-shape as seen in a front view. Concrete description thereof is given hereinafter.

The spacer 40 has a first plate 42 that structures the vehicle transverse direction inner side wall of the spacer 40, and plural (three in the present embodiment) second plates 50A, 50B, 50C (see FIG. 1) that extend-out toward the vehicle transverse direction outer side from the first plate 42.

The first plate 42 extends, on the whole, in the longitudinal direction with the plate thickness direction thereof substantially being the vehicle transverse direction. Further, the rear portion of the first plate 42 (in detail, the portion that structures the spacer main body portion 40A) is bent substantially in the shape of a crank as seen in a plan view, and is disposed adjacent to the vehicle transverse direction outer sides of the outer side wall 12A of the FS member 12 and the pair of projecting portions 18. Concretely, the first plate 42 is structured to include a first side wall portion 42A that abuts (the outer side surface of) the outer side wall 12A of the FS member 12 at the front side of the pair of projecting portions 18, and an engaging wall portion 42B that serves as an "engaging portion" that extends-out toward the vehicle transverse direction outer side from the rear end of the first side wall portion 42A at the front side of the pair of projecting portions 18. Moreover, the first plate 42 has a second side wall portion 42C that serves as an "adjacent portion" that extends-out toward the rear side from the vehicle transverse direction outer side end of the engaging wall portion 42B. The second side wall portion 42C abuts (the projection surfaces 18A1) of the outer walls 18A of the projecting portions 18. Due thereto, the portion at the rear end side of the spacer 40 is disposed so as to overlap the projecting portions 18 as seen in a side view.

Further, a pair of first fastening holes 44 that are circular (and that, in the broad sense, are elements that can be understood as being "first mounting portions") are formed so as to pass-through the first side wall portion 42A. The first fastening holes 44 are disposed coaxially with the first weld nuts WN 1. Further, due to first bolts B1 (fastening members) being inserted from the vehicle transverse direction outer side into the first fastening holes 44 and the first insert-through holes 20, and the first bolts B1 being screwed-together with the first weld nuts WN1, the first side wall portion 42A is fastened and fixed to the outer side wall 12A of the FS member 12 at the regions of the first fastening holes 44.

Moreover, a pair of second fastening holes 46 that are circular (and that, in the broad sense, are elements that can be understood as being "second mounting portions") are formed so as to pass-through the second side wall portion 42C. The second fastening holes 46 are disposed coaxially with the second weld nuts WN2. Further, due to second bolts B2 (fastening members) being inserted from the vehicle transverse direction outer side into the second fastening holes 46 and the second insert-through holes 22, and the second bolts B2 being screwed-together with the second weld nuts WN2, the second side wall portion 42C is fastened and fixed to the outer walls 18A of the projecting portions 18 at the regions of the second fastening holes 46. Due thereto, the rear end portion of the second side wall portion 42C abuts (the projection surfaces 18A1 of) the projecting portions 18 at the rear side of the first fastening holes 44 and the second fastening holes 46.

Note that, in detail, when a predetermined collision load toward the rear side is inputted to the front end portion of the spacer 40 as described later, the fastened state of the spacer 40 and the FS member 12 by the first bolts B1 and the second bolts B2 is cancelled, and the spacer 40 is displaced toward the rear side relative to the FS member 12. Concretely, for example, the mechanical strength of the spacer 40 (the first plate 42) is structured to be higher than the mechanical strength of the first bolts B1 and the second bolts B2. Further, due to a predetermined collision load, the first bolts B1 (the second bolts B2) are pushed by the inner peripheral surfaces of the first fastening holes 44 (the inner peripheral surfaces of the second fastening holes 46), and the first bolts B1 (the second bolts B2) break, and, due thereto, the fastened state of the spacer 40 and the FS member 12 is cancelled. Or, for example, the mechanical strength of the first bolts B1 and the second bolts B2 is structured to be higher than the mechanical strength of the spacer 40 (the first plate 42). Then, due to a predetermined collision load, the inner peripheral surfaces of the first fastening holes 44 (the second fastening holes 46) are pushed by the first bolts B1 (the second bolts B2), and the first fastening holes 44 (the second fastening holes 46) plastically deform such that the diameters thereof increase, and, due thereto, the fastened state of the spacer 40 and the FS member 12 is cancelled.

Further, the engaging wall portion 42B is disposed so as to be apart, toward the front side, from the front walls 18B of the projecting portions 18, and a gap G (see FIG. 2) is formed between the engaging wall portion 42B and the front walls 18B of the projecting portions 18. Moreover, the engaging wall portion 42B and the front walls 18B of the projecting portions 18 are disposed so as to be parallel as seen in a plan sectional view, and face one another in the longitudinal direction. Due thereto, there is a structure in which, at the time when a predetermined collision load toward the rear side is inputted to the front end portion of the spacer 40 and the fastened state of the spacer 40 and the FS member 12 cancelled, the engaging wall portion 42B and the front walls 18B of the projecting portions 18 engage in the longitudinal direction, and the front walls 18B of the projecting portions 18 receive the spacer 40 from the rear side.

Moreover, as shown in FIG. 2, the rear end of the second side wall portion 42C (i.e., the rear end of the spacer 40) is disposed further toward the front side than the rear ends of the projecting portions 18. Namely, in the present embodiment, the rear end of the spacer 40 is disposed so as to overlap the projecting portions 18 as seen in a side view, and is structured so as to not project-out toward the rear side with respect to the projecting portions 18.

On the other hand, the front portion of the first plate 42 (in detail, the portion that structures the spacer extension portion 40B) is a front-side side wall portion 42D. As seen in a plan view, the front-side side wall portion 42D is inclined toward the vehicle transverse direction outer side while heading from the front end of the first side wall portion 42A toward the front side. Namely, the border portion between the front-side side wall portion 42D and the first side wall portion 42A is bent, and the front-side side wall portion 42D moves apart from the FS member 12 toward the vehicle transverse direction outer side while heading toward the front side. Further, the front end portion of the front-side side wall portion 42D is disposed at the vehicle transverse direction outer side with respect to the vehicle transverse direction outer end of the bumper RF 30. As seen in a plan view, the front end portion of the front-side side wall portion 42D is disposed at a position that is flush with the front surface of the bumper RF 30.

As shown in FIG. 1, the second plates 50A through 50C extend in the longitudinal direction with the vertical direction being the plate thickness directions thereof, and are disposed so as to be lined-up in the vertical direction with a predetermined interval therebetween. Further, the vehicle transverse direction inner side end portions of the second plates 50A through 50C are formed so as to correspond to the bent shape of the first plate 42, and are joined to the outer side surface of the first plate 42 by welding or the like. Concretely, the second plates 50A, 50C that are disposed at the top and the bottom are joined by welding or the like to the upper and lower ends of the first plate 42 respectively, and extend toward the vehicle transverse direction outer side from the first plate 42. Further, the second plate 50B that is disposed in the middle in the vertical direction is joined by welding or the like to the vertical direction central portion of the first plate 42, and extends toward the vehicle transverse direction outer side from the first plate 42. Further, the head portions of the aforementioned first bolts B1 and second bolts B2 are disposed between the second plate 50A and the second plate 50B, and between the second plate 50B and the second plate 50C.

Further, as shown in FIG. 2, the front end surfaces of the second plates 50A through 50C extend in the vehicle transverse direction so as to be flush with the front surface of the bumper RF 30 as seen in a plan view. Moreover, the vehicle transverse direction outer side end surfaces of the second plates 50A through 50C are inclined toward the vehicle transverse direction outer side while heading toward the front side as seen in a plan view. Concretely, the vehicle transverse direction outer side end surfaces of the second plates 50A through 50C are inclined such that the width dimension of the spacer 40 becomes smaller while heading toward the front side.

(Operation and Effects)

Operation and effects of the present embodiment are described next while comparing the present embodiment with a vehicle front portion structure of a comparative example that is described hereinafter. Note that the vehicle front portion structure of the comparative example is structured similarly to the present embodiment except for the points described hereinafter. Namely, as shown in FIG. 3A, in the vehicle front portion structure of the comparative example, the projecting portions 18 are omitted at the FS member 12. In other words, at the front end portion of the FS member 12, the outer side surface of the outer side wall 12A is formed in a planar shape. Further, in correspondence with the outer side surface of the outer side wall 12A, at the first plate 42 of the spacer 40, the engaging wall portion 42B is omitted, and the first side wall portion 42A and the second side wall portion 42C of the spacer 40 are disposed flush with one another.

Further, the state shown in FIG. 3A is a state immediately before a small overlap collision of the vehicle 10, at the vehicle front portion structure of the comparative example. When, from this state, the vehicle 10 and a collision body I come into a small overlap collision, the collision body I collides with the front end portion of the spacer 40 (refer to the collision body I that is shown by the two-dot chain line in FIG. 3A), and collision load F toward the rear side is inputted to the front end portion of the spacer 40. Here, the spacer main body portion 40A of the spacer 40 is provided at the vehicle transverse direction outer side of the outer side wall 12A of the FS member 12, and is fastened to the outer side wall 12A by the first bolts B1 and the second bolts B2. Further, the spacer extension portion 40B of the spacer 40 extends-out toward the front side and the vehicle transverse direction outer side from the spacer main body portion 40A.

Therefore, when the collision load F is inputted to the front end portion of the spacer 40, the spacer 40 starts to rotate in the arrow A direction in FIG. 3A with mainly the region of the second fastening holes 46 being the starting point, such that the rear end portion of the spacer 40 (in detail, the rear end portion of the second side wall portion 42C) is displaced toward the vehicle transverse direction inner side. Due thereto, the rear end portion of the spacer 40 acts so as to push the outer side wall 12A of the FS member 12 in toward the vehicle transverse direction inner side, and load toward the vehicle transverse direction inner side is applied from the spacer 40 to the FS member 12. As a result, as shown in FIG. 3B, the FS member 12 bends, with the region that contacts the rear end portion of the spacer 40 being the starting point, so as to become convex toward the vehicle transverse direction inner side, and the bent FS member 12 hits the power unit of the vehicle. Accordingly, lateral force toward the vehicle transverse direction inner side is generated at the power unit.

In this way, in the above-described vehicle front portion structure of the comparative example, in the initial stage of a small overlap collision of the vehicle 10, the FS member 12 bends so as to become convex toward the vehicle transverse direction inner side. Therefore, this is a structure in which it is difficult to compressively deform the FS member 12 in the longitudinal direction by the collision load F that is inputted to the spacer 40.

The vehicle front portion structure S of the present embodiment at the time when the vehicle 10 is involved in a small overlap collision is described next. The state shown in FIG. 4A is a state immediately before a small overlap collision at the vehicle 10 of the present embodiment. Further, at the time of a small overlap collision of the vehicle 10, when the collision body I collides with the front end portion of the spacer 40 (refer to the collision body I shown by the two-dot chain line in FIG. 4A), the collision load F toward the rear side is inputted from the collision body I to the front end portion of the spacer 40. When the collision load F is inputted to the front end portion of the spacer 40, in the same way as in the above-described comparative example, the spacer 40 starts to rotate toward the arrow A direction side in FIG. 4A with mainly the regions of the second fastening holes 46, that are fastened to the FS member 12 by the second bolts B2, being the starting point.

Here, the pair of projecting portions 18 that project-out toward the vehicle transverse direction outer side are formed at the outer side wall 12A of the FS member 12. Therefore, the outer side wall 12A of the FS member 12 is reinforced by the pair of projecting portions 18, and the bending strength of the FS member 12 in the vehicle transverse direction is high as compared with the above-described comparative example.

Further, the rear end portion of the second side wall portion 42C of the spacer 40 abuts the projection surfaces 18A1 of the projecting portions 18 at the rear side of the first fastening holes 44 and the second fastening holes 46. Therefore, when the spacer 40 starts to rotate with mainly the second fastening holes 46 being the starting point, the second side wall portion 42C acts so as to push the pair of projecting portions 18 in toward the vehicle transverse direction inner side, and load toward the vehicle transverse direction inner side is inputted from the second side wall portion 42C to the FS member 12. At this time, because the bending strength of the FS member 12 in the vehicle transverse direction is increased by the pair of projecting portions 18 as described above, the FS member 12 bending so as to become convex toward the vehicle transverse direction inner side is suppressed (it is difficult for the FS member 12 to bend) as compared with the above-described comparative example.

Figure 4B:
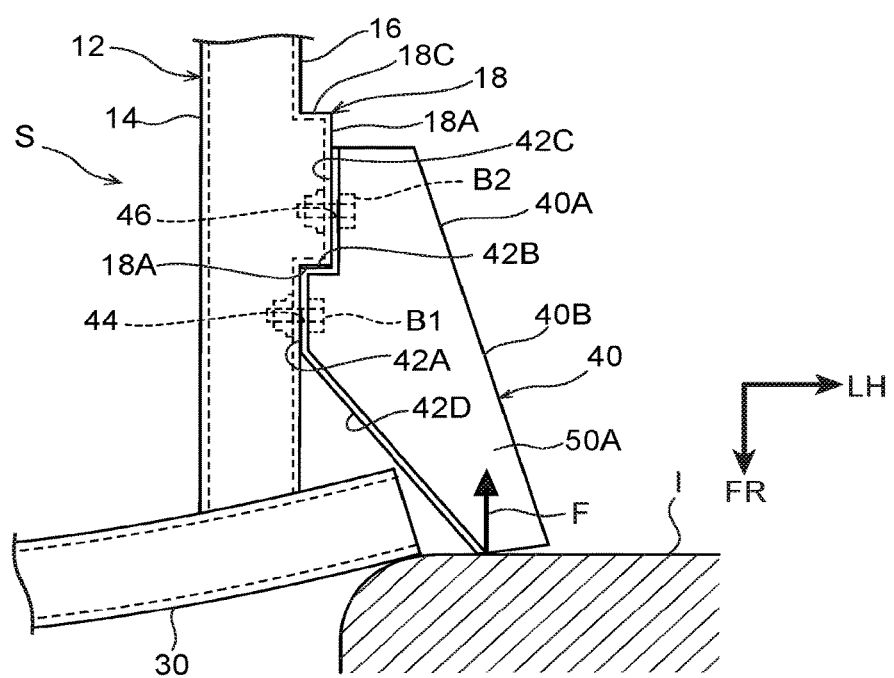
FIG. 4B is a plan view illustrating the initial state of the small overlap collision between the collision body and the vehicle illustrated in FIG. 4A.

Moreover, the engaging wall portion 42B, that is structured so as to be able to engage with the front walls 18B of the projecting portions 18 in the longitudinal direction, is formed at the spacer 40 at the front side of the projecting portions 18. Further, when the predetermined collision load F toward the rear side is inputted, the fastened state of the spacer 40 and the FS member 12 is cancelled. Therefore, as shown in FIG. 4B, the spacer 40 is displaced by the collision load F toward the rear side relative to the FS member 12, and the engaging wall portion 42B of the spacer 40 and the front walls 18B of the projecting portions 18 engage in the longitudinal direction. Due thereto, the front walls 18B of the projecting portions 18 receive the spacer 40 from the rear side, and the collision load F is transmitted via the projecting portions 18 to the FS member 12. As a result, the FS member 12 compressively deforms in the longitudinal direction due to the collision load F that has been transmitted to the FS member 12. Due to the above, in accordance with the vehicle front portion structure S of the present embodiment, in the initial stage of a small overlap collision of the vehicle 10, the FS member 12 bending so as to become convex toward the vehicle transverse direction inner side is suppressed, and the FS member 12 can be compressively deformed in the longitudinal direction. Accordingly, the collision energy at the time of a small overlap collision of the vehicle 10 can be absorbed effectively.

Further, in the present embodiment, the engaging wall portion 42B of the spacer 40 and the front walls 18B of the projecting portions 18 are disposed so as to face one another in the longitudinal direction, and the gap G is formed between the engaging wall portion 42B of the spacer 40 and the front walls 18B of the projecting portions 18. Therefore, assembly errors at the time of assembling the spacer 40 to the FS member 12 can be absorbed by this gap G.

Moreover, by forming the gap G between the engaging wall portion 42B of the spacer 40 and the front walls 18B of the projecting portions 18, it can be made such that the spacer 40 is easily displaced toward the rear side relative to the FS member 12. Namely, when the collision load F is inputted to the spacer 40, the fastened state of the spacer 40 and the FS member 12 can be cancelled easily.

Further, the projecting portions 18 that extend in the longitudinal direction are formed as a pair at the outer side wall 12A of the FS member 12, and are disposed so as to be lined-up in the vertical direction. Therefore, the reinforcing effect of the projecting portions 18 with respect to the FS member 12 can be strengthened.

Moreover, the spacer 40 is fastened to the outer side wall 12A of the FS member 12 at the front side of the projecting portions 18, and the spacer 40 is fastened to the outer walls 18A of the projecting portions 18. Therefore, in the initial stage of a small overlap collision, the collision load F that is transmitted from the spacer 40 to the FS member 12 can be dispersed. Due thereto, the FS member 12 bending so as to become convex toward the vehicle transverse direction inner side can be suppressed more.

Further, the rear end of the spacer 40 is disposed so as to overlap the projecting portions 18 as seen in a side view. Therefore, when the spacer 40 starts to rotate with mainly the second fastening holes 46 being the starting point, the rear end of the spacer 40 can be supported from the vehicle transverse direction inner side by the projecting portions 18. Due thereto, rotation of the spacer 40 with respect to the FS member 12 is suppressed effectively, and the FS member 12 bending so as to become convex toward the vehicle transverse direction inner side can be suppressed effectively.

Moreover, the front end portion of the spacer 40 is disposed at the vehicle transverse direction outer side of the bumper RF 30, and, as seen in a plan view, the front end of the spacer 40 is disposed so as to be flush with the front surface of the bumper RF 30. Therefore, at the time of a small offset collision, the collision body I can hit the front end portion of the spacer 40 at an early stage.

Note that, in the present embodiment, the first side wall portion 42A of the spacer 40 is fastened to the outer side wall 12A of the FS member 12 at the region of the first fastening holes 44, and the second side wall portion 42C of the spacer 40 is fastened to the projecting portions 18 of the FS member 12 at the region of the second fastening holes 46. However, the second fastening holes 46 may be omitted at the spacer 40. Namely, the spacer 40 may be fastened to the outer side wall 12A of the FS member 12 at the region of the first fastening holes 44. In this case, at the time of a small overlap collision, the spacer 40 starts to rotate with the first fastening holes 44 being the starting point, and the second side wall portion 42C acts so as to push the pair of projecting portions 18 in toward the vehicle transverse direction inner side. Therefore, in the same way as in the present embodiment, the second side wall portion 42C pushes-in the region of the FS member 12 that is structured to have high bending strength due to the pair of projecting portions 18, and therefore, the FS member 12 bending so as to become convex toward the vehicle transverse direction inner side can be suppressed.

Further, as shown in FIG. 5, the second weld nuts WN2 and the second insert-through holes 22 of the FS member 12 may be disposed at the rear side of the projecting portions 18, and the spacer 40 and the FS member 12 may be connected at the rear side of the projecting portions 18. Namely, the rear end portion of the spacer 40 may be extended toward the rear side as compared with the present embodiment, and this extended portion may be fastened to the FS member 12. Concretely, the first plate 42 of the spacer 40 is extended toward the rear side as compared with the present embodiment. Further, a third side wall portion 42E, that is made to abut the outer side wall 12A of the FS member 12 at the rear side of the projecting portions 18, is formed, and a connecting wall portion 42F, that connects the front end of the third side wall portion 42E and the rear end of the second side wall portion 42C at the rear side of the projecting portions 18, is formed. Further, the second fastening holes 46 are formed in the third side wall portion 42E, and the spacer 40 and the FS member 12 may be fastened by the second bolts B2 and the second weld nuts WN2 at the rear side of the projecting portions 18. In this case as well, the bending strength of the FS member 12 is structured to be high due to the projecting portions 18, and therefore, bending of the FS member 12 at the time of a small overlap collision can be suppressed.

Figure 6A:
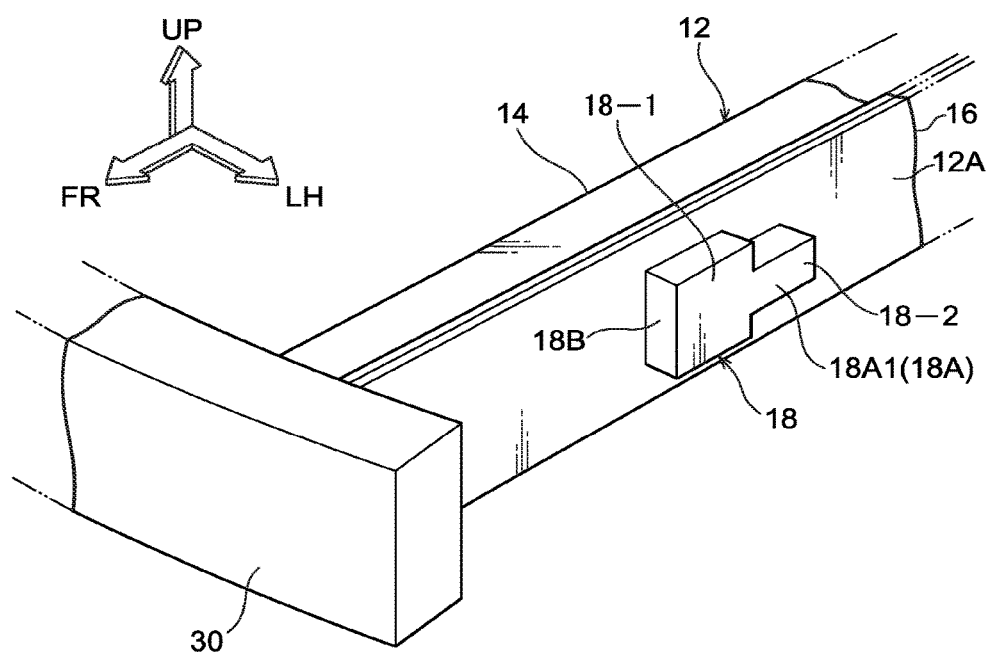
FIG. 6A is a perspective view that is seen obliquely from a vehicle front left side and illustrates an example of a modified example of a projecting portion illustrated in FIG. 1.

Further, in the present embodiment, the pair of projecting portions 18 project-out toward the vehicle transverse direction outer side from the outer side wall 12A of the FS member 12, and, as seen in a side view, are formed in substantially rectangular shapes whose length directions are the longitudinal direction. However, the shape of and the number of the projecting portions 18 can be changed arbitrarily. For example, as shown in FIG. 6A, the projecting portion 18 may be formed at one place at the outer side wall 12A, and the projecting portion 18 may be formed in a substantial T-shape as seen in a side view. Concretely, the projecting portion 18 is structured by a first projecting portion 18-1 that extends in the vertical direction, and a second projecting portion 18-2 that extends toward the rear side from the vertical direction intermediate portion of the first projecting portion 18-1. Due thereto, the front wall 18B of the projecting portion 18 is formed continuously in the vertical direction, and the engaging wall portion 42I3 of the spacer 40 can be efficiently received by the front wall 18B of the projecting portion 18 at the time of a small overlap collision. Note that, in FIG. 6A, the first insert-through holes 20, the second insert-through holes 22, and the spacer 40 are omitted for convenience.

Figure 6B:
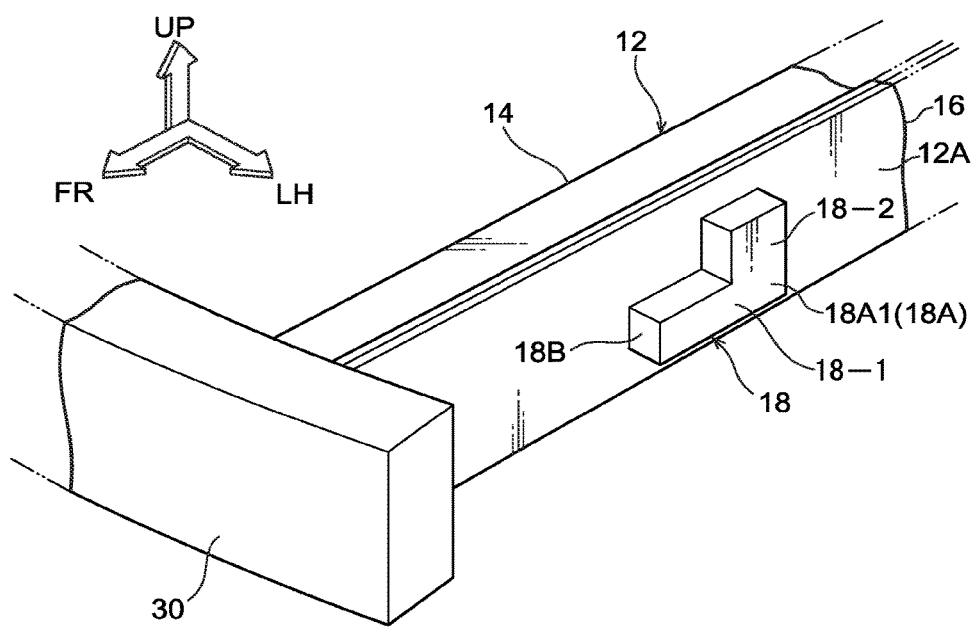
FIG. 6B is a perspective view that is seen obliquely from a vehicle front left side and illustrates another example of a modified example of the projecting portion illustrated in FIG. 1.

Further, for example, as shown in FIG. 6B, the projecting portion 18 may be formed at one place at the outer side wall 12A, and the projecting portion 18 may be formed in a substantially backward L-shape as seen in a side view. Concretely, the projecting portion 18 may be structured to include the first projecting portion 18-1 that extends in the longitudinal direction, and the second projecting portion 18-2 that extends toward the upper side from the rear end portion of the first projecting portion 18-1. Note that, in FIG. 6B as well, in the same way as in FIG. 6A, the first insert-through holes 20, the second insert-through holes 22, and the spacer 40 are omitted.

Further, for example, as shown in FIG. 7, the outer wall 18A of the projecting portion 18 may be inclined toward the vehicle transverse direction outer side while heading toward the rear side as seen in a plan sectional view. In this case, the second side wall portion 42C of the spacer 40 is inclined toward the vehicle transverse direction outer side while heading toward the rear side as seen in a plan view, in correspondence with the outer wall 18A of the projecting portion 18. Further, in this case, the second fastening holes 46 may be omitted at the second side wall portion 42C of the spacer 40.

Figure 8:
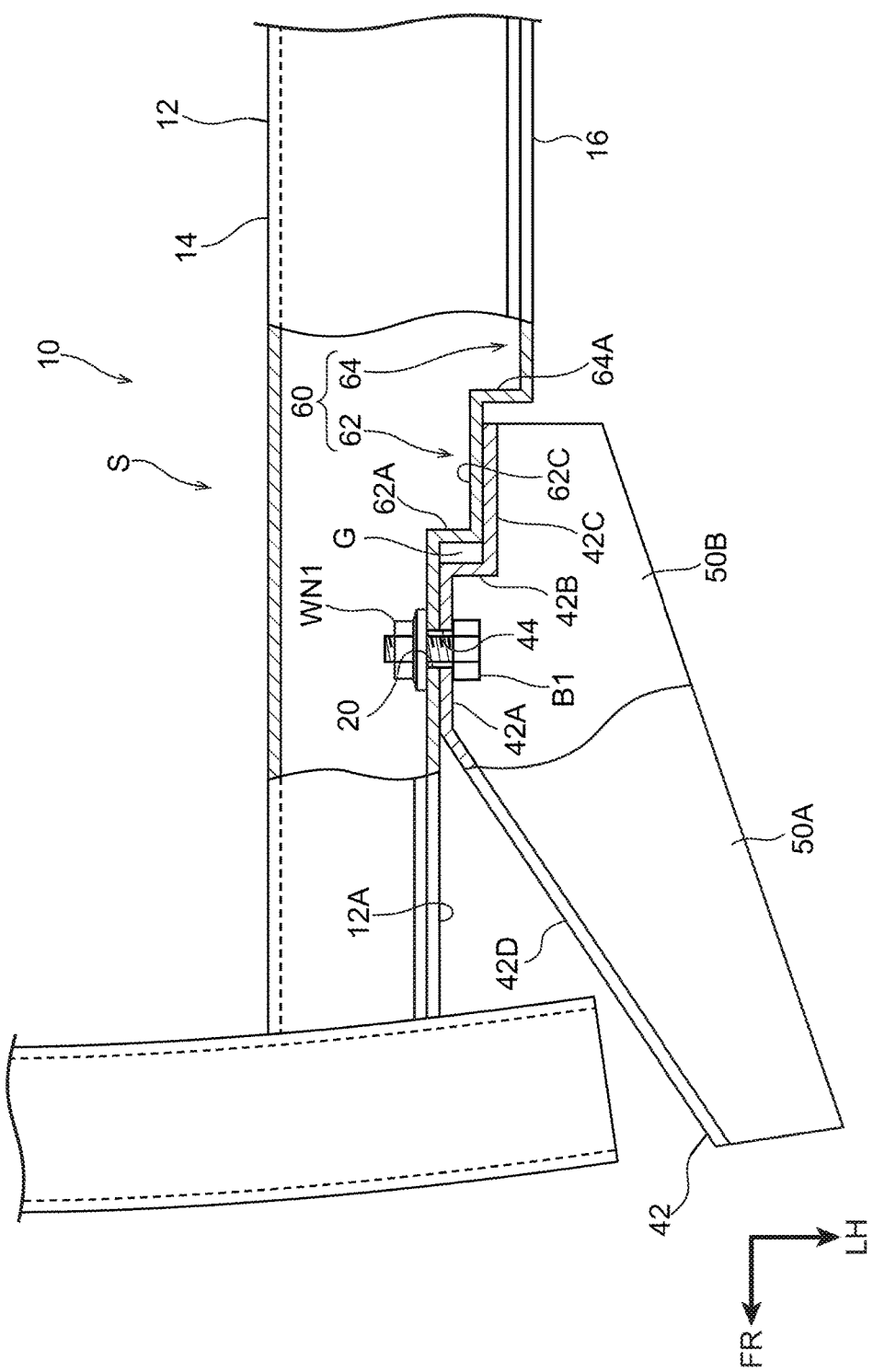
FIG. 8 is a partial plan sectional view that corresponds to FIG. 2 and that illustrates an example in which the projecting portion illustrated in FIG. 2 is changed into a step portion.

Further, for example, as shown in FIG. 8, instead of the projecting portions 18 of the present embodiment, a step portion 60 that is step-shaped may be formed at the outer side wall 12A of the FS member 12, and this step portion 60 may be made to be the "projecting portion" of the present invention. Concretely, the step portion 60 has a first step portion 62 that projects-out toward the vehicle transverse direction outer side from the outer side wall 12A of the FS member 12, and a second step portion 64 that projects-out toward the vehicle transverse direction outer side with respect to the first step portion 62. Further, the second side wall portion 42C of the spacer 40 is made to abut a bottom wall 62C of the first step portion 62. At the time of a small overlap collision, the engaging wall portion 42B of the spacer 40 engages with a front wall 62A of the first step portion 62, and the rear end of the spacer 40 engages with a front wall 64A of the second step portion 64. Due thereto, at the time of a small overlap collision of the vehicle 10, the spacer 40 is received from the rear side by the first step portion 62 and the second step portion 64 of the FS member 12, and therefore, the collision load F can be transmitted efficiently to the FS member 12.

Further, from the standpoint of efficiently transmitting the collision load F that is toward the rear side to the projecting portions 18, it is desirable that the engaging wall portion 42B of the spacer 40 and the front walls 18B of the projecting portions 18 are disposed so as to face one another in the longitudinal direction, as in the present embodiment. However, the engaging wall portion 42B and the front walls 18B may be arranged as follows. Namely, as seen in a plan sectional view, one of the engaging wall portion 42B of the spacer 40 and the front walls 18B of the projecting portions 18 may be disposed so as to be tilted slightly with respect to the other of the engaging wall portion 42B and the front walls 18B.

Further, in the present embodiment, the projecting portions 18 are formed integrally with the outer side wall 12A of the FS member 12. Instead, for example, a block body that is shaped as a block may be provide integrally with the outer side wall 12A of the FS member 12, and this block body may be made to be the "projecting portion" of the present invention.

Further, in the present embodiment, the spacer 40 is structured by the first plate 42 and the three second plates 50A through 50C, but the form of the spacer 40 is not limited to this. For example, the spacer 40 may be formed in a solid shape. In this case, there may be a structure in which counterbores, that open toward the vehicle transverse direction outer side and into which the first bolts B1 and the second bolts B2 are inserted, are formed in the spacer 40, and the first fastening holes 44 and the second fastening holes 46 are formed at the bottom walls of these counterbores.

Further, for example, a front wall portion that is bent toward the vehicle transverse direction inner side may be formed at the front end portion of the first plate 42 of the spacer 40, and a rear wall portion that is bent toward the vehicle transverse direction inner side may be formed at the rear end portion of the first plate 42, and these front wall portion and rear wall portion may be joined to the front ends and the rear ends of the second plates 50A through 50C respectively.

Further, for example, a plate that connects the second plates 50A through 50C respectively may be added at the length direction intermediate portion of the spacer 40.

Further, in the present embedment, the position of the front end of the spacer 40 is disposed at a position that is flush with the front surface of the bumper RF 30 as seen in a plan view. However, the position of the front end of the spacer 40 may be disposed at the front side or at the rear side with respect to the front surface of the bumper RF 30, in correspondence with various types of vehicles. In particular, in a case in which the position of the front end of the spacer 40 is disposed at the front side with respect to the front surface of the bumper RF 30, because the front end portion of the spacer 40 projects-out toward the front side with respect to the bumper RF 30, the collision body I can hit the front end portion of the spacer 40 at an even earlier stage at the time of a small overlap collision.

Further, in the present embodiment, the first fastening holes 44 and the second fastening holes 46 of the spacer 40 are formed in circular shapes, but the first fastening holes 44 and the second fastening holes 46 may be formed in the shapes of long holes whose length directions are the longitudinal direction. In this case, when a predetermined collision load toward the rear side is inputted to the spacer 40, the fastened state of the spacer 40 and the FS member 12 is cancelled due to the first fastening holes 44 (the second fastening holes 46) being displaced toward the rear side relative to the first bolts B1 (the second bolts B2). Namely, the fastening torque of the first bolts B1 and the second bolts B2 may be set such that, when a predetermined collision load toward the rear side is inputted to the spacer 40, the spacer 40 is displaced toward the rear side relative to the FS member 12.

Further, in a case in which the first fastening holes 44 and the second fastening holes 46 are formed in the shapes of long holes, there may be a structure in which the gap G between the engaging wall portion 42B of the spacer 40 and the front walls 18B of the projecting portions 18 is omitted. Namely, the engaging wall portion 42B and the front walls 18B of the projecting portions 18 may be set so as to abut one another. In this case, the engaging wall portion 42B and the front walls 18B of the projecting portions 18 are engaged in advance in the longitudinal direction. Therefore, at the time of a small overlap collision of the vehicle 10, in the same way as in the present embodiment, the front walls 18B of the projecting portions 18 receive the spacer 40 from the rear side, and the collision load F is transmitted to the FS member 12 via the projecting portions 18. Due thereto, the FS member 12 can be compressively deformed in the longitudinal direction by the collision load F that is transmitted to the FS member 12.

Further, in the present embodiment, the spacer 40 and the FS member 12 are fastened together due to the first bolts B1 (the second bolts B2) being screwed-together with the first weld nuts WN1 (the second weld nuts WN2), but the method of fastening the spacer 40 and the FS member 12 together is not limited to this. For example, stud bolts that project-out toward the vehicle transverse direction outer side may be provided at the FS member 12, and the spacer 40 and the FS member 12 may be fastened together due to nuts being screwed-together with these stud bolts. Further, the spacer 40 and the FS member 12 may be fastened together by welding or the like, or may be fastened together by using clips or the like.

Further, in the present embodiment, the vehicle front portion structure S is applied to the vehicle transverse direction both side portions of the front end portion of the vehicle 10, but the vehicle front portion structure S may be applied to one of the vehicle left side portion and the vehicle right side portion of the front end portion of the vehicle 10. In this case, the other of the vehicle left side portion and the vehicle right side portion of the front end portion of the vehicle 10 may be made to be a structure that is different than the vehicle front portion structure S.

What is claimed is:

1. A vehicle front portion structure comprising:
a front side member that extends in a vehicle longitudinal direction at a vehicle transverse direction outer side portion of a vehicle front portion, and that includes a plurality of projecting portions that project out toward a vehicle transverse direction outer side at an outer side wall at a front end portion, the plurality of the projecting portions being provided at the outer side wall, extending in the vehicle longitudinal direction, and being disposed so as to be lined-up in a vehicle vertical direction;
a spacer that is provided at a vehicle transverse direction outer side of the front side member so as to overlap with outer walls of the projecting portions, that is fastened to the outer side wall at a vehicle front side of the projecting portions, and that has an adjacent portion that is adjacent to a vehicle transverse direction outer side of the projecting portions; and
an engaging portion that is formed at the spacer, that is disposed at a vehicle front side with respect to the projecting portions, and that is structured to be able to engage with a front end of the projecting portions in the vehicle longitudinal direction,
wherein, in a case in which a predetermined collision load toward a vehicle rear side is inputted to the spacer, the adjacent portion abuts the outer walls of the projecting portions at the vehicle transverse outer side.

2. The vehicle front portion structure of claim 1, wherein a gap is formed between the front end of the projecting portions and the engaging portion.

3. The vehicle front portion structure of claim 1, wherein the spacer is fastened to the projecting portions in addition to the outer side wall.

4. The vehicle front portion structure of claim 1, wherein, as seen in a side view, a rear end of the spacer is disposed so as to overlap the projecting portions.

5. The vehicle front portion structure of claim 1, wherein the spacer includes a side wall portion which abuts the outer side wall of the front side member, the engaging portion extends out toward the vehicle transverse direction outer side from a rear end of the side wall portion, and the adjacent portion extends from a rear end of the engaging portion.

6. A vehicle front portion structure comprising:
a front side member that extends in a vehicle longitudinal direction at a vehicle transverse direction outer side portion of a vehicle front portion, and that includes a projecting portion that projects-out toward a vehicle transverse direction outer side at an outer side wall at a front end portion;
a spacer that is provided at a vehicle transverse direction outer side of the front side member so as to overlap with an outer wall of the projecting portion, that is fastened to the outer side wall at a vehicle front side of the projecting portion, and that has an adjacent portion that is adjacent to a vehicle transverse direction outer side of the projecting portion; and
an engaging portion that is formed at the spacer, that is disposed at a vehicle front side with respect to the projecting portion, and that is structured to be able to engage with a front end of the projecting portion in the vehicle longitudinal direction,
wherein, in a case in which a predetermined collision load toward a vehicle rear side is inputted to the spacer, the adjacent portion abuts the outer wall of the projecting portion at the vehicle transverse outer side, and
wherein the spacer includes a side wall portion which abuts the outer side wall of the front side member, the engaging portion extends out toward the vehicle transverse direction outer side from a rear end of the side wall portion, and the adjacent portion extends from a rear end of the engaging portion.

7. The vehicle front portion structure of claim 6, wherein a gap is formed between the front end of the projecting portion and the engaging portion.

8. The vehicle front portion structure of claim 6, wherein:
a plurality of the projecting portions are provided at the outer side wall, and extend in the vehicle longitudinal direction; and
the plurality of the projecting portions are disposed so as to be lined-up in a vehicle vertical direction.

9. The vehicle front portion structure of claim 6, wherein the spacer is fastened to the projecting portion in addition to the outer side wall.

10. The vehicle front portion structure of claim 6, wherein, as seen in a side view, a rear end of the spacer is disposed so as to overlap the projecting portion.

* * * * *